(12) United States Patent
Chabanne et al.

(10) Patent No.: US 12,105,642 B2
(45) Date of Patent: Oct. 1, 2024

(54) METHODS FOR ENROLLING DATA IN ORDER TO VERIFY THE AUTHENTICITY OF A SECURITY DATUM OR FOR VERIFYING THE AUTHENTICITY OF A SECURITY DATUM

(71) Applicant: Idemia Identity & Security France, Courbevoie (FR)

(72) Inventors: Hervé Chabanne, Courbevoie (FR); Linda Guiga, Courbevoie (FR); Sébastien Bahloul, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 316 days.

(21) Appl. No.: 17/804,409

(22) Filed: May 27, 2022

(65) Prior Publication Data

US 2022/0391327 A1  Dec. 8, 2022

(30) Foreign Application Priority Data

Jun. 2, 2021 (FR) ...................................... 2105799

(51) Int. Cl.
*G06F 12/14* (2006.01)
*H04L 9/32* (2006.01)

(52) U.S. Cl.
CPC ........ *G06F 12/1408* (2013.01); *H04L 9/3239* (2013.01); *G06F 2212/1052* (2013.01)

(58) Field of Classification Search
CPC ......... G06F 12/1408; G06F 2212/1052; H04L 9/3239
See application file for complete search history.

(56) References Cited

FOREIGN PATENT DOCUMENTS

FR  3047688 A1  8/2017
FR  1759292 A1  4/2019

OTHER PUBLICATIONS

Galbraith et al., "Obfuscated Fuzzy Hamming Distance and Conjunctions from Subset Product Problems", Theory of Cryptography Conference, LNSC, vol. 11891, Nov. 2019, pp. 1-30.
Zobernig et al., "When Are Opaque Predicates Useful?", 2019 18th IEEE International Conference on Trust, Security and Privacy in Computing and Communications/13th IEEE International Conference on Big Data Science and Engineering, 2019, pp. 168-175.
"Preliminary Search Report," for French Application No. 2105799 dated Feb. 15, 2022 (with English translation cover sheet).

*Primary Examiner* — Normin Abedin
(74) *Attorney, Agent, or Firm* — WOMBLE BOND DICKINSON (US) LLP

(57) ABSTRACT

The invention relates to a method for enrolling data in order to verify the authenticity of a security datum, the method comprising implementing by data processing means of a server the steps of: obtaining a reference security datum, generating a first encoded datum by applying to the reference security datum an obfuscated fuzzy Hamming distance encoding procedure, determining from the reference security datum, a plurality of derived data of the reference security datum, generating a first random datum, and determining a second encoded datum such that a variable point comparison predicate parameterized by the second encoded datum and the first random datum is true when said variable point has as coordinates said derived data, storing on a data storage means of the server at least said first and second encoded data. The invention also relates to a verification method and a server for this purpose.

16 Claims, 3 Drawing Sheets

METHODS FOR ENROLLING DATA IN ORDER TO VERIFY THE AUTHENTICITY OF A SECURITY DATUM OR FOR VERIFYING THE AUTHENTICITY OF A SECURITY DATUM

CROSS-REFERENCE TO RELATED APPLICATIONS

This application claims priority pursuant to 35 U.S.C. 119(a) to France Patent Application No. 2105799, filed Jun. 2, 2021, which application is incorporated herein by reference in its entirety.

TECHNICAL FIELD OF THE INVENTION

The invention relates to methods for enrolling data in order to verify the authenticity of a security datum and for verifying the authenticity of a security datum.

STATE OF THE ART

Holding a valid identity document (identity card, passport, driving license, Social Security card, etc.) provides evidence of the identity of an individual.

Identity documents consist of a medium generally of paper or plastic on which a photo is printed along with personal alphanumeric information (surname, given name, date of birth, etc.) of its holder. There is further a strip called MRZ (Machine-Readable Zone), which contains a code (generally two lines of 36 characters) summarizing the alphanumeric information of the document. Alternatively to the MRZ, there can be a barcode like a PDF-417 barcode containing the same information.

Generally, identity documents have a large number of high-level security features such as watermarks or holograms to prevent forgery. The lifespan of such a document is generally limited (10 or 15 years), because the appearance of its holder changes progressively and the security features evolve.

When an individual is checked by an entity, for example at the entrance of a building, he is asked to present his identity document for authentication. It is desirable that this process be as quick as possible, while still being as secure as possible. Indeed, for example the risk is that the checked individuals may have a forged identity document wherein the information has been modified, for example the photograph.

Methods known from applications FR3047688, then FR1759292 are methods of enrolling data intended to be used to automatically check the identity of an individual, and associated identity control methods, based on a very clever mechanism of generation of security data called "Digital Photo Seal" from a visual feature of an identity document (the photo in particular). This security datum constitutes a sort of signature of the visual feature: images acquired from the same visual feature, irrespective of the conditions of acquisition (i.e. including using a scan or photocopy), which lead to obtaining substantially identical security data. On the contrary, the slightest modification of the visual feature results in a strong variation of said security feature.

Thus, it is sufficient to store on a database of a server the "expected" reference security datum for a given document, and to compare it with the "candidate" generated from a copy of said document, to determine if the visual feature of this document is real or not.

In particular, to guarantee the security of the reference datum on the server, this datum is "masked" by applying an encoding procedure (typically a Secure Sketch type procedure) to the reference datum and to a random datum, and the masked reference datum is stored in the database with a cryptographic footprint, i.e. a hash, of a concatenation of the MRZ with said random datum.

Thus, an identity document presented by an individual can be authenticated on the basis of its MRZ (or any other alphanumerical datum) and the photograph: a candidate security datum is obtained from the photograph of the presented document, and it is then possible, by applying a decoding procedure, to recover the random datum if the photograph of the presented document is identical to the one on the basis of which the reference security data was generated, and to verify that the hash of a concatenation of the MRZ (or the alphanumerical datum) with said random datum corresponds to the one stored.

This solution is satisfactory, but there are rare cases of "false acceptance" in which the Secure Sketch decoding procedure makes it possible to find the random datum despite a candidate security datum that does not coincide with the reference security datum (the photograph presented is different from that of the document), which could be exploited by an attacker in order to authenticate fraudulently.

And, even without false acceptance, in case of a brute force attack, the attacker will be able to learn from the Secure Sketch, via the number of errors corrected by the corrective code and thus converge towards the solution.

It would thus be desirable to have a novel, simple, reliable and totally secure solution for encoding/decoding a security datum in order to be able to automatically verify the authenticity of a target personal datum.

BRIEF DESCRIPTION OF THE INVENTION

According to a first aspect, the invention relates to a method for enrolling data in order to verify the authenticity of a security datum, the method being characterized in that it comprises the implementation by data processing means of a server of steps of:
(A) Obtaining a reference security datum;
(B) Generating a first encoded datum by applying to the reference security datum an obfuscated fuzzy Hamming distance encoding procedure;
(C) Determining, from the reference security datum, a plurality of derived data of the reference security datum;
(D) Generating a first random datum, and determining a second encoded datum such that a variable point comparison predicate parameterized by the second encoded datum and the first random datum is true when said variable point has as coordinates said derived data;
(E) Storing on data storage means of the server at least said first and second encoded data.

According to advantageous and non-limiting characteristics:

Step (D) further comprises generating a second random datum and a third random datum; step (E) comprising storing the following on the data storage means of the server:
  A cryptographic hash value of a concatenation of the second and third random data;
  A sum of the first and second random data;
  The third random datum.
The reference security datum has n binary coordinates denoted $w_i$, the obfuscated Hamming distance encoding procedure comprising the drawing of n+1 prime numbers denoted p1, p2 . . . pn, and q, and the computation of a product $\Pi p_i^{wi}$ mod q.

Said parameters of the predicate define a line and the variable point comparison predicate is true if and only if said variable point lies on this line.

Said variable point comparison predicate is expressed by the formula "$\Sigma_{i=0}^{k-1} a_i W i + b = W k$", wherein $a = (a_1 \ldots a_{k-1})$ is the second encoded datum, b is the first random datum, and W1, W2 . . . Wk are said plurality of derived data.

A first and a second derived data constitute said plurality of derived data.

Said variable point comparison predicate is expressed by the formula "aW1+b==W2", wherein a is the second encoded datum, b is the first random datum, and W1 and W2 are the first and second derived data, respectively.

The reference security datum is a piece of information representing an expected appearance of a target personal datum.

Either the target personal datum is a visual feature and said security datum is of Digital Photo Seal type; or the target personal datum is a biometric feature and said security datum is a biometric template.

The target personal datum originates from an individual's identity document.

According to a second aspect, the invention proposes a method for verifying the authenticity of a security datum, characterized in that it comprises implementing by data processing means of a server steps of:
(a) Obtaining a candidate security datum;
(b) Computing a first decoded datum by applying an obfuscated fuzzy Hamming distance decoding procedure to the candidate security datum and to a first encoded datum stored on the data storage means of the server;
(c) Determining, from the first decoded datum first, a plurality of derived data of the first decoded datum;
(d) Computing a second decoded datum, corresponding to a first random datum, such that a variable point comparison predicate parameterized by a second encoded datum stored on the data storage means of the server and the second decoded datum is true when said variable point has as coordinates said derived data.

According to advantageous and non-limiting characteristics:
The method further comprises a step (e) of verifying that a cryptographic hash value of a concatenation of a computed second random datum and a third random datum stored on the data storage means of the server coincides with an expected cryptographic hash value stored on the data storage means of the server, the second random datum being computed from the second decoded datum and a sum of the first and second random data stored on the data storage means of the server.

The candidate security datum is a piece of information representing a visible appearance of a target personal datum in an image, step (a) comprising extracting said candidate datum from the image.

Step (a) comprises the prior acquisition of said image by optical acquisition means of a client device and the transmission to the server.

According to a third aspect, the invention proposes a server for enrolling data in order to verify the authenticity of a security datum, characterized in that it comprises data storage means and data processing means configured to:

Obtain a reference security datum;
Generate a first encoded datum by applying to the reference security datum an obfuscated fuzzy Hamming distance encoding procedure;
Determine, from the reference security datum, a plurality of derived data of the reference security datum;
Generate a first random datum, and determine a second encoded datum such that a variable point comparison predicate parameterized by the second encoded datum and the first random datum is true when said variable point has as coordinates said derived data;
Store on the data storage means at least said first and second encoded data.

According to a fourth aspect, the invention proposes a server for verifying authenticity of a security datum, characterized in that it comprises data storage means and data processing means configured to:

Obtain a candidate security datum;
Compute a first decoded datum by applying an obfuscated fuzzy Hamming distance decoding procedure to the candidate security datum and to a first encoded datum stored on the data storage means;
Determine, from the first decoded datum, a plurality of derived data of the first decoded datum;
Compute a second decoded datum, corresponding to a first random datum, such that a variable point comparison predicate parameterized by a second encoded datum stored on the data storage means and the second decoded datum is true when said variable point has as coordinates said derived data;
verify the second decoded datum.

According to a fifth and a sixth aspects, the invention proposes a computer program product comprising code instructions for executing a method according to the first or the second aspect for enrolling data in order to verify the authenticity of a security datum or for verifying the authenticity of a security datum; and a computer-readable storage means in which a computer program product comprises code instructions for executing a method according to the first or the second aspect for enrolling data in order to verify the authenticity of a security datum or for verifying the authenticity of a security datum.

DESCRIPTION OF THE FIGURES

Other characteristics, purposes and advantages of the present invention will be seen from the following detailed description with regard to the appended figures, provided by way of non-limiting example, and wherein.

DETAILED DESCRIPTION

The present invention relates on the one hand to a method for enrolling data in order to verify the authenticity of a security datum, and on the other hand to a method for verifying the authenticity of a security datum. These methods are advantageously used in the context of verifying the authenticity of a target personal datum represented by the security datum (such as a biometric datum, but also any visual feature such as a photograph) preferentially originating from an identity document 1, in particular with a view to checking the identity of an individual or authenticating an identity document 1, but we will not be limited to this particular embodiment.

Figure 1:
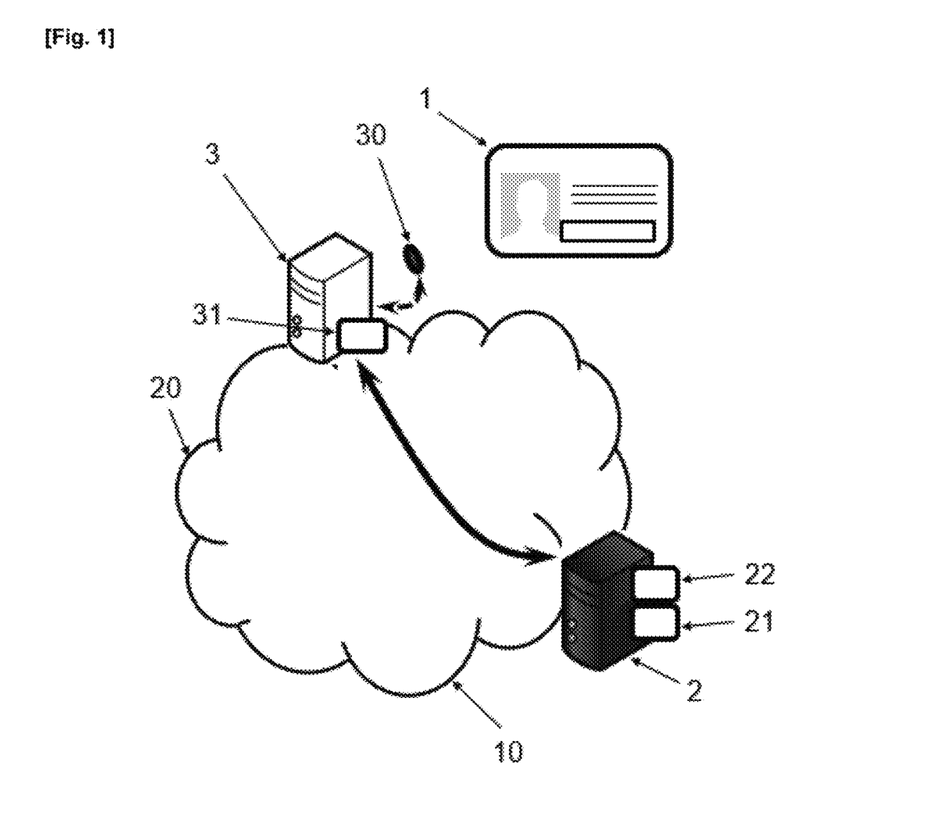
FIG. 1 is a diagram of a system for implementing the methods according to the invention.

In reference to FIG. 1, it is a diagram of an architecture of a system for implementing the present methods. This system comprises at least one server 2. The system may also comprise client equipment 3 connected to the server 2 via a network 20 such as Internet.

The security datum is as explained any datum derived from a target personal datum which it protects: the target personal datum cannot be retrieved from the security datum, but this security datum characterizes the target personal datum.

As will be seen, said target personal datum is typically associated uniquely with an individual (i.e. it is an identity datum), in particular a photograph of said individual, preferentially the one that is visible on the individual's identity document 1, but also a fingerprint, a handwritten signature, or even the complete visual appearance of the individual's identity document 1, etc. It is understood that all these target personal data never have a unique appearance (two photos of the same individual will never be exactly the same), hence the need to extract derived security data and for a "fuzzy" procedure to be able to compare two data.

The server 2 is remote equipment, secure, typically of an authority or a security solution supplier. It comprises data processing means 21 (processor type) and data storage means 22 (a memory, for example a drive).

The client device 3 is a local terminal advantageously comprising optical acquisition means 30 (typically a photo camera or a scanner), and suitable for obtaining or if need be transmitting to the server 2 an image from which it is possible to extract the security datum (i.e. representing the target personal datum, for example a photograph of the identity document which shows the photograph of the individual, or even learnedly an image of the individual—in particular of a biometric feature of the individual). The client device 3 and the server 2 advantageously comprise communication interfaces enabling them to dialog remotely. It should be noted that the client 3 may also be an individual's mobile terminal (especially a smartphone).

It is noted that the device 3 is optional; the security data to be processed can be supplied directly to the server. It should also be noted that the client device 3 may include its own data processing means 31 and implement certain processing operations; see below.

It is noted that it is quite possible for other entities to be connected to the server 2 and to the device 3, in particular servers performing services using the statements produced by the device 3, i.e. services wishing authentication of an individual or of their identity document 1, for example a server of a bank, of a hotel, etc.

In a known manner, the present methods preferentially use as security datum a piece of information representing an appearance of the target personal datum, that is a datum that is descriptive of at least one fragment of the target personal datum as it appears, i.e. a "signature", that will enable comparisons.

"Reference" security datum refers to the information representing the "theoretical" appearance of the target personal datum, i.e. as expected. Conversely, "candidate" security datum refers to the information representing the observed appearance of the target personal datum, i.e. to be verified (on the basis of which an individual is seeking, for example, authentication). It is understood as explained that said observed appearance is generally not perfectly identical to the expected appearance, due to the conditions of the defects inherent in the acquisition of an image, and to the variability of conditions of taking the shot (lighting, shaking, distance, etc.).

Nevertheless, said information representing the appearance is chosen in such a way that if two target personal data have appearances that match (i.e. it is the same individual/same document 1 even if the conditions in which the shot was taken are not identical), then their security data also match (i.e. they have a difference according to a given metric that is less than a threshold).

Thus, the reference security datum and the candidate security datum match if and only if the observed appearance and the expected appearance of the target personal datum match.

If the target personal datum is a biometric datum, the security datum can be any biometric template, i.e. set of characteristics defining a biometric feature, for example the position of minutiae for a digital fingerprint.

If the target personal datum is a visual feature (typically a photograph of all or part of an identity document 1), it is possible to use as security datum the "Digital Photo Seal" (DPS), as described in the applications cited in the introduction or more precisely in application EP3206192, based on the position of singular points of a graphic element, or any other "signature" of a candidate personal datum.

The DPS of a photograph is a characteristic of this image that is not a biometric template (note that the DPS can be used as security datum even if the target personal datum is an image representing a biometric feature—for example the photograph of the face of an individual as visible on their identity document—but it is then understood that the personal datum is treated as an image and not as a biometric datum), and can for example include a histogram of oriented gradients (this is called an algorithm with HOG descriptor).

In any case, it is alternatively possible to use a feature extraction algorithm (the security datum is then a feature map) applied to the candidate personal datum, of the type employing a convolutional neural network, also known by the acronym CNN.

Figure 2A:
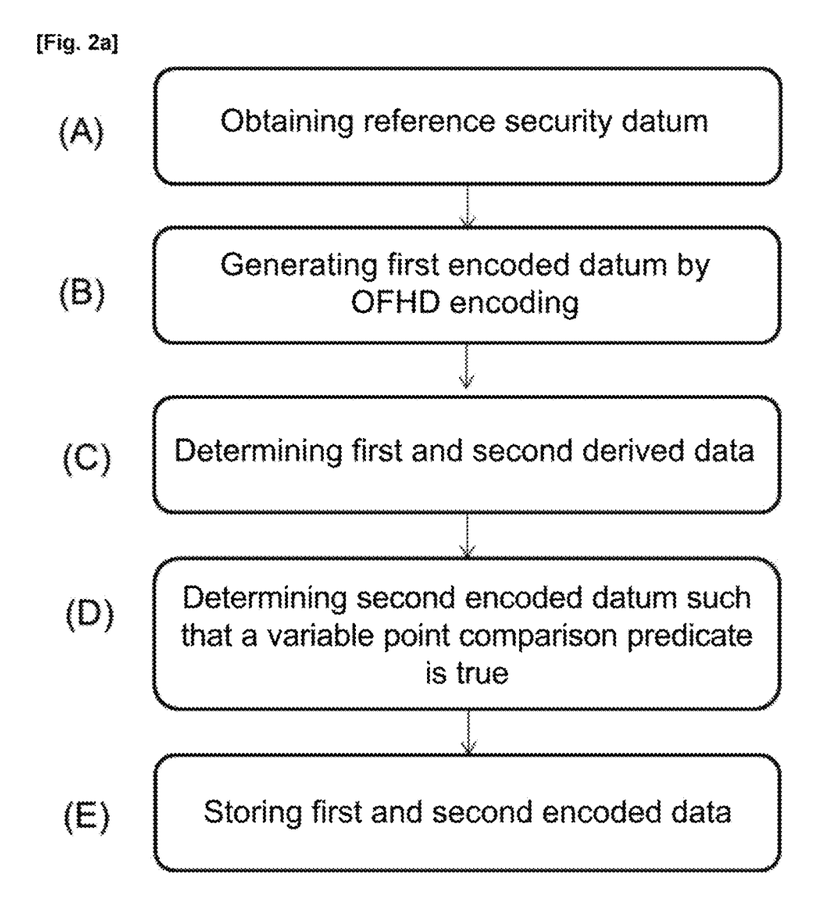
FIG. 2a shows the steps of one embodiment of an enrollment method according to the invention.

In reference to FIG. 2a, according to a first aspect, a method is proposed that is implemented by the data processing means 21 of the server 2 for enrolling data in order to verify the authenticity of a security datum.

The method starts with a step (A) of obtaining a reference security datum, in particular representing an expected appearance of a target personal datum. W denotes the reference security datum, and W' denotes a candidate security datum.

As explained, a person skilled in the art may use any type of security datum produced in any known way; the server 2 can simply receive it from the outside, for example from an authority.

Alternatively, step (A) may comprise extracting the reference security datum from the target personal datum, which can be provided by an authority (e.g. the "official" photograph of the individual from the identity document 1), or by the individual themselves, for example by taking a photograph of their face or their identity document via the terminal 3.

Then, in a step (B), a first encoded datum is generated by applying to the reference security datum an original encoding procedure like "Obfuscated Fuzzy Hamming Distance", or simply OFHD, see the document *Steven D. Galbraith, Lukas Zobernig: Obfuscated Fuzzy Hamming Distance and Conjunctions from Subset Product Problems. TCC 2019*, rather than by Secure Sketch. o(W) denotes the encoded security datum, i.e. the first encoded datum.

W is presumed to have n binary coordinates $w_i$, $1 \leq i \leq n$ (i.e. W is a datum on n bits), for example n=512 for a DPS on an identity document 1.

The OFHD is based on the "modular subset product" problem, which says that given an integer r<n/2, n distinct prime numbers $p_i$, $1 \leq i \leq n$, a prime number q such that the product of a subset of r of $p_i$ is less than q ($\Pi_{i \in J} p_i < q$ for any 1 subset of $\{1, 2, \ldots n\}$ of size r) and the integer equal to the product of a chosen subset of $p_i$ modulo q (equal to $\Pi p_i^{xi}$ mod q with $x_i=1$ if $p_i$ is chosen and 0 otherwise), it is statistically impossible to find the subset of the chosen prime numbers $p_i$ when q is large enough. It is then possible to obfuscate the vector of $x_i$, in particular the vector W (i.e. $x_i = w_i$).

The first security datum can then be expressed as the vector of dimension n+2 comprising $p_i$, q and $\Pi p_i^{wi}$ mod q, i.e. $o(W)=(p1, p2 \ldots p_n, q, \Pi p_i^{wi})$.

On the other hand, from another datum W', it is possible to decode o and to find W when W and W' are close enough in the sense of the Hamming distance by using the techniques known as continued fractions and, for example, Euclid's algorithm.

Decode(o,W') denotes the algorithm which from a candidate security datum W' and o(W) seeks to find W.

For example, considering vectors with n=512 coordinates as security data, with a maximum Hamming distance of 91 for acceptance. This gives a size for q of 1138 bits. With these parameters, the probability of finding a random element close enough to W is less than $2^{-172}$. On a standard PC, Decode is executed in around 200 ms.

The advantage of OFHD compared to Secure Sketch is that in case of error an attacker does not gain additional information about W. Indeed, Decode(o,W') returns either W if W' is close enough to W, or returns nothing, or another value W" otherwise; in any case, the attacker cannot determine whether they are close to W, and cannot converge. On the other hand, unlike Secure Sketch, OFHD does not offer a "payload" in which it can store a random value. Indeed, the OFHD encoding procedure only takes the security datum as input.

In this respect, the present methods cleverly propose pairing OFHD with another technique, referred to as variable point comparison predicate, to generate a second encoded datum, this time having a payload for a random datum.

First, the method comprises a step (C) of determining, from the reference security datum, a plurality of derived data of the reference security datum, including at least a first and second derived data (with k≥2 their total number, preferentially k=2 or 3), such that each of the derived data alone cannot be traced back to the reference security datum. It is quite possible for it to not be possible to trace back to the security datum even knowing all the derived data. The derived data of the reference security datum are derived from the the reference security datum. Of course the various derived data must be different, i.e. obtained by several different derivations.

As explained, we may simply have exactly two derived data, i.e. said plurality of derived data consists in a first and a second derived data, and W1 and W2 denote the first and second derived data. There may be more than two derived data, a third derived data, etc. (in a general way, W1, W2, . . . Wk denote said plurality of derived data).

The k derived data can be seen as k "coordinates" obtained from the security datum.

Any derivation functions may be used. According to a first embodiment, the security datum is simply divided into k parts, i.e. W1 and W2 are the two parts of W when k=2, this division itself being able to be done in several different ways (selecting one bit out of k, the n/k first/next/last bits, etc.).

According to a second embodiment, the derived data are k cryptographic hash values obtained by k different hash functions (this includes two different parameterizations of the same hash function). It is possible to hash all or part of the security datum, and for example to hash in the same way each of the parts obtained by division according to the first embodiment.

Then, in a step (D), a first random datum is generated (as we will see a second or even a third random datum can also be generated), and a second encoded datum is then determined such that a variable point comparison predicate parameterized by the second encoded datum and the first random datum is true when said variable point has as coordinates said derived data (the first derived datum is a first coordinate, the second second derived datum is a second coordinate; etc.). The random datum is, as its name suggests, a datum having a random value that provides randomness, which is important since knowing it will make it possible to prove that we actually have the reference security datum.

Obfuscation by variable point comparison predicate is proposed in the document *Lukas Zobernig, Steven D. Galbraith, Giovanni Russello: When are Opaque Predicates Useful? TrustCom/BigDataSE 2019*.

The idea is to construct a predicate (i.e. a Boolean object) with the form $P(x_1, x_2, \ldots x_k)_{a,b}$ which is true substantially only when the $x_1 \ldots x_k$ have expected values. It can be seen that a and b are parameters of the predicate. The predicate compares two values and can thus be expressed as $P(x_1, x_2, \ldots, x_k)_{a,b} = \text{"}f(x_1, x_2, \ldots, x_k)_{a,b} == 0\text{"}$.

Compared to what is described in the above-mentioned document, cleverly, it is not sought to obfuscate the derived data W1 . . . Wk but rather the first random datum, which is therefore noted respectively with the second encoded datum b and a. In other words, the second encoded datum and the first random datum are chosen as parameters a and b and the predicate is a function of W1, W2, etc., i.e. the predicate is expressed as $P(W1, W2, \ldots Wk)_{a,b}$. It is to be noted that a can be a vector, i.e. have several components (advantageously k−1 components), et be expressed as $a=(a_1, a_2, \ldots a_{k-1})$. By convenience, if a has only one component, the notations a and $a_1$ may coincide.

Preferably, said parameters of the predicate (second encoded datum and first random datum) define a line and the predicate is true if and only if said variable point lies on this line, which is thus notably the case (but not exclusively) when the variable point has as coordinates said first and second derived data. In the case wherein there are two redived data, this is a line in the plane, in the case wherein there are two redived data, this is a line in sapce, etc. Of course the invention will not be limited to a line, and for instance a polynominal object could be used.

The function $f(x_1, x_2, \ldots, x_k)_{a,b}$ is in other words preferentially chosen as $a_1 x_1 + a_2 x_2 \ldots + b - x_k$, i.e. the predicate is $P(x_1, x_2, \ldots, x_k)_{a,b} = \text{"}\Sigma_{i=0}^{k-1} a_i x_i + b == x_k\text{"}$ (equation of said line), and thus the formula linking the second encoded datum a, the random datum b, and the derived data W1, W2 . . . Wk est $\Sigma_{i=0}^{k-1} a_i Wi + b = Wk$. In the case of a polynominal object, we have for example $\Sigma_{i=0}^{k-1} a_i W_i^{zi} + b = Wk$ where the zi are predefined non-zero (positive or negative) integers.

Back to the embodiment of a line with k=2, the function $f(x_1, x_2)_{a,b}$ is in other words preferentially chosen as ax+b−y, i.e. the predicate is $P(x_1, x_2)_{a,b} = \text{"}ax_1 + b == x_2\text{"}$ (equation of said line), and thus the formula linking the second encoded datum a (which has here a single component), the random datum b, and the derived data W1 and W2 is aW1+b=W2.

In summary, the encoding of step (D) consists in finding a(b) such that $a_1W1+a_2W2 \ldots +b=Wk$, so as to "mask" b, but this equation is not limiting.

Knowing b, W1 and W2, a can be easily computed as a function of these three other data, and in particular if the predicate is $P(W1,W2)_{a,b}$="aW1+b==W2" it is enough to set a=(W2−b)/W1 for the predicate to be true for the variable point of coordinates (W1, W2). If k>2, there is a plurality of suitable a, we may for instance randomly draw from $a_z$ up to $a_{k-1}$ and set $a_1$=(Wk−b−$a_2$W2 ... −$a_{k-1}$Wk−1)/W1 for the predicate to be true for the variable point of coordinates (W1, W2, ... Wk). It is naturally possible to proceed symetrically with another component than $a_1$.

The associated decoding procedure is simple, because starting from the second encoded datum a, having the correct derived data W1 and W2 it is possible to find b by computing Wk−$a_1$W1−$a_2$W2 ... −$a_{k-1}$Wk−1.

More precisely, assuming that decoding o(W) using the candidate datum W' returns W", the use of the predicate makes it possible to recover the payload of the second encoded datum a, that is the first random datum b if W"=W, without revealing any information about W.

To do this, data derived from W" (denoted W1", W2" ... Wk") are computed by the same derivation as for W1, W2, ... Wk, and the decoded datum, that is the payload b" respecting the predicate, i.e. b"=Wk"−$a_1$W1"−$a_2$W2" ... −$a_{k-1}$Wk−1" in the case of a line equation, is calculated. If k=2, b"=W2"−aW1".

If W' is not close enough to W, then W" is not equal to W and the decoded datum b" is not the correct value of the random datum b.

The present method ends the enrollment with a step (E) of storing on the data storage means 22 of the server 2 at least said first and second encoded data (o and a).

Preferably, when step (D) comprises generating a second random datum and a third random datum, step (E) also comprises storing the following on the data storage means 22 of the server 2:

A cryptographic hash value of a concatenation of the second and third random data;
A sum of the first and second random data;
The third random datum.

It is understood that the second datum and the third datum can of course be swapped.

Denoting the second and third random data r and t gives: h=H(r|t) the cryptographic hash value and u=r+b. In the end o, a, h, t and u are therefore stored.

These additional data make it possible to test the obtained b" again without revealing the masked value of b: it is enough to verify that H(u−b"|t)=h.

It is noted that this solution is not in any way limiting, and it is possible for example just to verify that H(b"|t)=H(b|t), or any other technique known to the skilled person to verify that b"=b by revealing b as little as possible.

It is understood that none of the stored data o, a, h, t and u are usable by themselves because:
The first encoded datum o does not make it possible to trace back to W, even by testing W' iteratively;
The second encoded datum a does not make it possible to trace back to b unless W is known with certainty;
h is a simple cryptographic hash value and t is a random datum that provides no information;
The result of the sum u does not make it possible to trace back to b unless r is known with certainty In an additionally known manner, step (E) can comprise storing on the storage means 22 an encryption of at least one other datum to be protected such as a personal alphanumeric datum, with a key based on the first random datum (for example a cryptographic hash value of a concatenation of the first random datum and of said personal alphanumeric datum).

It should be noted that the enrollment method can be repeated at regular intervals in order to verify or update the security data or the other personal data. Recent and reliable data can be retrieved from a government entity. Furthermore, an identity document 1 has only a limited lifespan, and must be renewed regularly.

Preferably, as will be seen hereunder, it can be planned to limit the number of times an o(w) can be computed/decoded for the same source, i.e. given a reference security datum W, when a bound is passed, the system refuses a new computation involving W.

Figure 2B:
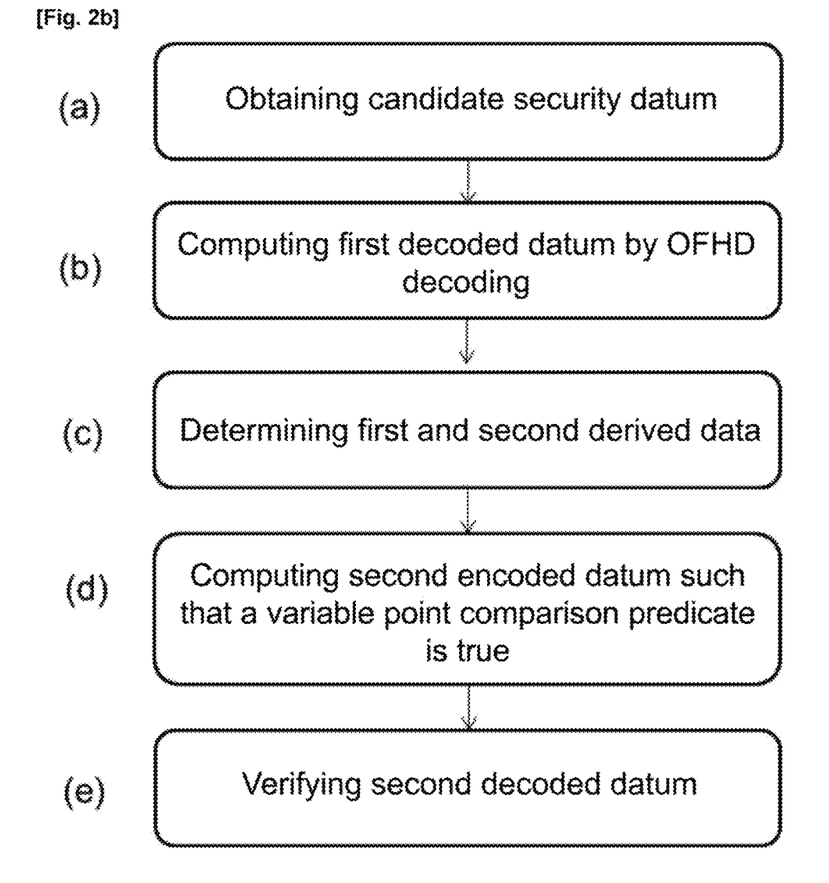
FIG. 2b shows the steps of one embodiment of a verification method according to the invention.

In reference to FIG. 2b, it is now supposed that the enrollment was carried out successfully, and that a candidate security datum to be verified, denoted W', was obtained (step (a) of the method for verifying the authenticity of a security datum). The candidate security datum is typically a piece of information representing a visible appearance of a target personal datum (e.g. a biometric feature) in an image.

In a preferred embodiment, the verification method starts in step (a) by obtaining in one way or another (for example via the acquisition means 30 of the client 3) an image, in particular an image of a user or an image of an identity document 1, the image representing at least the visible target personal datum. For example, said image can represent the entire identity document 1 and present the photograph of the individual holding the identity document 1.

Typically, it is the individual who takes a photo of their face or their identity document 1 using their mobile terminal.

Step (a) may also comprise extracting said candidate datum from the image (for example its DPS, or else a biometric template if the image is that of a biometric feature), either by the server 2 (if the terminal 3 has sent it the image), or by the actual terminal 3, and it then transmits the candidate security datum directly. If necessary, the procedure is exactly the same as in the enrollment method.

It is understood that the reference and candidate security data must be obtained in an identical way in order to be compared.

The objective is to verify that step (a) has taken place correctly as disclosed previously, and that it is not a forgery (for example an image that had been fraudulently modified). In order to do this, the individual or any other entity that wishes to verify the candidate security datum requests it from the server 2.

In a step (d), the data processing means 21 of the server 2 compute a first decoded datum by applying an obfuscated fuzzy Hamming distance decoding procedure to said candidate security datum and to a first encoded datum stored on the data storage means 22 of the server 2.

More precisely, the server 2 accesses the first encoded datum o associated with the reference security datum (typically referenced with the hash value of an identifier, this identifier being able to be that of the individual or of their identity document), and applying said above-mentioned decoding procedure Decode(o, W') (use of Euclid's algorithm for example). As explained, the output is a first decoded datum W"' which corresponds to the reference security datum W if the reference security datum W and the candidate security datum W' are close enough in the sense of the Hamming distance.

In general, the result of a comparison of the candidate security datum and the reference security datum should show that they are identical, or at least have a distance less than a predetermined threshold of error. For example, for visual features, security data like Digital Photo Seal are considered to match if they differ by less than 17%. Thus, a maximum Hamming distance of 91, for example, is taken for acceptance.

At this point, it would be possible to compare W" and W, but doing so would provide additional information about W.

Thus, in a step (c), first and second data derived from the first decoded datum are determined from the first decoded datum, in exactly the same way as the plurality of derived data of the reference security datum during enrollment (division into k parts, hashing, etc.). It is thus understood that if W=W", then W1=W1", W2=W2", etc.

Finally, in a step (d), the server 2 accesses the second encoded datum an associated with the reference security datum and a second decoded datum, i.e. a payload of the second encoded datum a, denoted b", corresponding to a first random datum (i.e. b"=b if W=W") is computed, such that a variable point comparison predicate parameterized by the second encoded datum and the second decoded datum is true when said variable point has for coordinates said derived data W1", W2", . . . Wk" (as explained said parameters of the predicate advantageously define a line and the variable point comparison predicate is true if and only if said variable point lies on this line, i.e. the variable point having for coordinates said derived data W1", W2", . . . Wk" lies on the line defined by the second encoded datum a and the second decoded datum b"). Knowing that the derived data W1", W2", . . . Wk" and the second encoded datum a are defined, the only variable remains the second decoded datum b".

The predicate is as explained preferentially "$a_1W1" + a_2W2" \ldots + b" = Wk"$", which is true if and only if $b" = Wk" - a_1W1" - a_2W2 \ldots - a_{k-1}Wk-1"$. In other words, step (f) preferably sees the computation of b" as W2"−aW1" when k=2.

At this stage, b" can be verified directly in a step (e) (i.e. verifying that the second decoded datum is equal to the first random datum) in order to verify the candidate security datum.

In a particularly preferred manner, the method comprises more precisely a step (e) of verifying that a cryptographic hash value of a concatenation of a computed second random datum and a third random datum stored on the data storage means 22 of the server 2 coincides with an expected cryptographic hash value stored on the data storage means 22 of the server 2.

Indeed, the server stores h and t, and if the value of r (the second random datum) is correct then h=H(r|t).

For this purpose the second random datum can be recomputed from the second decoded datum and a sum of the first and second random data stored on the data storage means 22 of the server 2 (i.e. the difference between said sum and the second decoded datum).

Indeed u=r+b, and u−b" is computed, which should be equal to r if b=b". In summary, it is verified that h=H(u−b"|t). Alternatively, as explained H(b|t) and H(b"|t) (the respective hash values of the first random datum and the second decoded datum concatenated with the third random datum) can be compared directly, for example by storing on the data storage means 22 of the server 2 the cryptographic hash value of the first random datum concatenated with the third random datum (i.e. H(b|t)).

If W' is too far from W, then W"≠W, b"≠b, and the entropy of the cryptographic hash functions means that a very different result will be reached.

If the provided image has been altered (for example by replacing the photograph on an identity document), then the corresponding candidate and reference security data will not match, a false value of the random datum and thus of the hash value will be obtained, and the authentication will be rejected. A fraudulent use alert can be issued.

If the hash value was found, it is because the candidate security datum is valid, i.e. not falsified. It can optionally be deduced that a target personal datum is authentic, and authenticate a user or their identity document on this basis.

If an encrypted version of at least one other datum to be protected is stored on the data storage means 22 of the server 2, such as a personal alphanumeric datum, with a key based on the first random datum (e.g. a cryptographic hash value of a concatenation of the first random datum and said personal alphanumeric datum), this datum can be decrypted by virtue of the second decoded datum (since it coincides with the first random datum).

Indeed, at this stage it is known that the second decoded datum corresponds to the first random datum and that the individual was able to successfully reconstruct the hash value. Said other datum or data to be protected, upon request, are then transferred to the client device 3. It is understood that, in order to guarantee confidentiality as much as possible, the server 2 should provide the encrypted data as it stands, and that it is at the client 3 that the decryption takes place, so as to avoid any clear transfer of personal data.

It should be noted that it could be provided that the user be authorized to take advantage of this to update said personal data: for a change of address, for example, the user modifies the data before re-encrypting them, and retransmitting all of them to the server 2 for storage.

According to a third aspect, the server 2 is proposed for implementing the methods according to the first or second aspect, i.e. an enrollment server for verifying the authenticity of a reference security datum and/or for verifying the authenticity of a candidate security datum.

The server 2 is typically connected to a network 20, and comprises data storage means 22 and data processing means 21 configured to (in the case of enrollment):
  Obtain a reference security datum (in particular by extraction from an image);
  Generate a first encoded datum by applying to the reference security datum an obfuscated fuzzy Hamming distance encoding procedure;
  Determine, from the reference security datum, a plurality of derived data of the reference security datum;
  Generate a first random datum (and possibly second and third random data), and determine a second encoded datum such that a variable point comparison predicate parameterized by the second encoded datum and the first random datum is true when said variable point has as coordinates said derived data;
  Store on the data storage means 22 at least said first and second encoded data (and possibly a cryptographic hash value of a concatenation of the second and third random data, a sum of the first and second random data, and the third random datum).

In the case of authentication, the data processing means 21 are also configured to:
  Obtain a candidate security datum (in particular by extraction from an image);

Compute a first decoded datum by applying an obfuscated fuzzy Hamming distance decoding procedure to the candidate security datum and to a first encoded datum stored on the data storage means 22;

Determine, from the first decoded datum, a plurality of derived data of the first decoded datum;

Compute a second decoded datum, corresponding to a first random datum, such that a variable point comparison predicate parameterized by a second encoded datum stored on the data storage means 22 and the second decoded datum is true when said variable point has as coordinates said derived data;

Verify the second decoded datum, advantageously by verifying that a cryptographic hash value of a concatenation of a computed second random datum and a third random datum stored on the data storage means 22 coincides with an expected cryptographic hash value stored on the data storage means 22, the second random datum being computed from the second decoded datum and a sum of the first and second random data stored on the data storage means 22.

The system may also include at least one client device 3 (typically connected to the server 2 via the network 20, directly or indirectly) comprising optical acquisition means 30 for acquiring said image (in particular of an individual or of their identity document 1).

According to a fourth and fifth aspect, the invention relates to a computer program product comprising code instructions for executing (in particular on the server 2 data processing means 21) a method according to the first or second aspect of the invention, as well as storage means readable by a computer equipment (a memory 22 of the server 2) whereupon this computer program product is located.

The invention claimed is:

1. A method for enrolling data in order to verify the authenticity of a security datum, the method comprising implementing by data processing means of a server, steps of:
   (A) obtaining a reference security datum;
   (B) generating a first encoded datum by applying to the reference security datum an obfuscated fuzzy Hamming distance encoding procedure;
   (C) determining, from the reference security datum, a plurality of derived data of the reference security datum;
   (D) generating a first random datum, and determining a second encoded datum such that a variable point comparison predicate parameterized by the second encoded datum and the first random datum is true when said variable point has as coordinates said derived data;
   (E) storing on a data storage means of the server at least said first and second encoded data.

2. The method according to claim 1, wherein step (D) also comprises generating a second random datum and a third random datum; step (E) comprising storing the following on the data storage means of the server (2):
   a cryptographic hash value of a concatenation of the second and third random data;
   a sum of the first and second random data;
   the third random datum.

3. The method according to claim 1, wherein the reference security datum has n binary coordinates denoted $w_i$, the obfuscated Hamming distance encoding procedure comprising the drawing of n+1 prime numbers denoted p1, p2 . . . pn, and q, and the computation of a product $\Pi p_i^{w_i}$ mod q.

4. The method according to claim 1, wherein said parameters of the predicate define a line and the variable point comparison predicate is true if and only if said variable point lies on this line.

5. The method according to claim 4, wherein said variable point comparison predicate is expressed by the formula "$\Sigma_{i=0}^{k-1} a_i Wi + b = Wk$", wherein $a=(a_1 \ldots a_{k-1})$ is the second encoded datum, b is the first random datum, and W1, W2, . . . Wk are said plurality of derived data.

6. The method according to claim 1, wherein the reference security datum is a piece of information representing an expected appearance of a target personal datum.

7. The method according to claim 6, wherein either the target personal datum is a visual feature and said security datum is a Digital Photo Seal; or the target personal datum is a biometric feature and said security datum is a biometric template.

8. The method according to claim 1, wherein the target personal datum originates from an individual's identity document.

9. A computer program product comprising code instructions for executing a method according to claim 1 for enrolling data in order to verify the authenticity of a security datum or for verifying the authenticity of a security datum, when said method is executed on a computer.

10. A computer-readable storage means in which a computer program product comprises code instructions for executing a method according to claim 1 for enrolling data in order to verify the authenticity of a security datum or for verifying the authenticity of a security datum.

11. A method for verifying the authenticity of a security datum comprising implementing by data processing means of a server steps of:
   (a) obtaining a candidate security datum;
   (b) computing a first decoded datum by applying an obfuscated fuzzy Hamming distance decoding procedure to the candidate security datum and to a first encoded datum stored on the data storage means of the server;
   (c) determining, from the first decoded datum, a plurality of derived data of the first decoded datum;
   (d) computing a second decoded datum, corresponding to a first random datum, such that a variable point comparison predicate parameterized by a second encoded datum stored on the data storage means of the server and the second decoded datum is true when said variable point has as coordinates said derived data;
   (e) verifying the second decoded data.

12. The method according to claim 11, further comprising a step (e) of verifying that a cryptographic hash value of a concatenation of a computed second random datum and a third random datum stored on the data storage means of the server coincides with an expected cryptographic hash value stored on the data storage means of the server, the second random datum being computed from the second decoded datum and a sum of the first and second random data stored on the data storage means of the server.

13. The method according to claim 11, wherein the candidate security datum is a piece of information representing a visible appearance of a target personal datum in an image, step (a) comprising the extraction of said candidate datum from the image.

14. The method according to claim 13, wherein step (a) comprises the prior acquisition of said image by optical acquisition means of a client device and the transmission to the server.

15. A data enrollment server for verifying the authenticity of a security datum, comprising data storage means and data processing means configured to:
- obtain a reference security datum;
- generate a first encoded datum by applying to the reference security datum an obfuscated fuzzy Hamming distance encoding procedure;
- determine, from the reference security datum, a plurality of derived data of the reference security datum;
- generate a first random datum, and determine a second encoded datum such that a variable point comparison predicate parameterized by the second encoded datum and the first random datum is true when said variable point has as coordinates said derived data;
- store on the data storage means at least said first and second encoded data.

16. A server for verifying the authenticity of a security datum, comprising data storage means and data processing means configured to:
- obtain a candidate security datum;
- compute a first decoded datum by applying an obfuscated fuzzy Hamming distance decoding procedure to the candidate security datum and to a first encoded datum stored on the data storage means;
- determine, from the first decoded datum, a plurality of derived data of the first decoded datum;
- compute a second decoded datum, corresponding to a first random datum, such that a variable point comparison predicate parameterized by a second encoded datum stored on the data storage means and the second decoded datum is true when said variable point has as coordinates said derived data;
- verify the second decoded datum.

* * * * *